United States Patent [19]
Fujiwara

[11] Patent Number: 5,455,650
[45] Date of Patent: Oct. 3, 1995

[54] PHOTOGRAPHIC CONVERTER

[75] Inventor: Yutaka Fujiwara, Kanagawa, Japan

[73] Assignee: Canon Kabushiki Kaisha, Tokyo, Japan

[21] Appl. No.: 216,041

[22] Filed: Mar. 22, 1994

Related U.S. Application Data

[63] Continuation of Ser. No. 847,948, Mar. 6, 1992, abandoned.

[30] Foreign Application Priority Data

Mar. 11, 1991 [JP] Japan .................................. 3-044897
Mar. 11, 1991 [JP] Japan .................................. 3-044898

[51] Int. Cl.$^6$ .................................................. G03B 17/14
[52] U.S. Cl. .................................................. 354/286
[58] Field of Search .......................... 354/195.12, 271.1, 354/286

[56] References Cited

U.S. PATENT DOCUMENTS

| | | | |
|---|---|---|---|
| 3,968,504 | 7/1976 | Komine | 354/286 X |
| 4,589,750 | 5/1986 | Tomori et al. | 354/271.1 |
| 4,627,699 | 12/1986 | Takagi | 354/195.12 |
| 4,881,094 | 11/1989 | Terui et al. | 354/286 |
| 4,912,494 | 3/1990 | Tanaka et al. | 354/286 X |
| 4,974,004 | 11/1990 | Kawasaki et al. | 354/286 |
| 5,003,339 | 3/1991 | Kikuchi et al. | 354/402 |
| 5,053,798 | 10/1991 | Ohara et al. | 354/286 |

Primary Examiner—Russell E. Adams
Assistant Examiner—J. K. Han
Attorney, Agent, or Firm—Robin, Blecker, Daley and Droscoll

[57] ABSTRACT

A converter mountable between a camera body and a lens barrel comprises a communication part arranged to communicate with the camera body, a signal output part arranged to output a signal for enabling the camera body to recognize that a lens barrel of a specific type is mounted, a first driving mechanism for driving a focusing-lens moving mechanism disposed within the lens barrel, and a second driving mechanism for driving a diaphragm device disposed within the lens barrel.

6 Claims, 5 Drawing Sheets

PHOTOGRAPHIC CONVERTER

This a continuation application under CFR 1.62 of prior application Ser. No. 07/847,948, filed Mar. 6, 1992, now abandoned.

BACKGROUND OF THE INVENTION

1. Field of the Invention

This invention relates to a converter arranged to be mounted between a camera body and a lens barrel.

2. Description of the Related Art

As a result of the recent advancement of the arts related to actuators, sensors, electronic circuits, etc., video cameras as well as still cameras have come to be mostly arranged to perform automatic focusing and automatic exposure control.

In the field of the single-lens reflex still camera, it has been known to arrange an interchangeable lens to permit control and driving actions on a diaphragm and a focusing lens to be mechanically accomplished from a camera body in a manner as disclosed in Japanese Patent Publication No. SHO 63-67171 or No. SHO 63-67172.

With respect to a method for driving the diaphragm and the lens of the lens-interchangeable type single-lens reflex camera, a camera system arranged to drive the lens and the diaphragm solely by electrical connection while obviating the necessity of any mechanical interlocking arrangement between the camera body and the lens barrel has been proposed, for example, as disclosed in Japanese Patent Publication No. HEI 1-17139. According to this camera system, each individual lens is arranged to have its own actuator. This arrangement enables the camera system to have many advantages in respect to the speed and accuracy of focusing, elimination of operation noises, etc.

Meanwhile, compact video cameras have become more and more popular. As a result, the need for arranging video cameras to permit use of interchangeable lenses has increased. It is desirable that such a lens-interchangeable video camera is also arranged like the above-stated camera system wherein only electrical connection is required and each lens has its own actuator.

There is also a great need for use on the above-stated camera body of such interchangeable lenses of the manual operating type that are on the market. It has been, however, sometimes impossible to meet the need because of such a problem as a difference in shape of mounts or because the lens mounted on the camera body cannot be electrically confirmed.

Further, it would be highly convenient for the users that an interchangeable lens designed for a camera system of the kind having the interchangeable lens mechanically interlocked with the camera body is arranged to be usable also for the camera body of a camera system of the above-stated kind operating solely by electrically connecting the camera body to the interchangeable lens. However, such arrangement has not been practicalized.

SUMMARY OF THE INVENTION

It is an object of this invention to provide a converter which is arranged to be mounted between a camera body and a lens barrel; to be provided with communication means for communication with the camera body; and to send to the camera body by the communication means a signal indicating that a lens barrel of a specific type is mounted on the camera body, so that a shooting operation can be adequately carried out even with a lens barrel of a type which differs from a normal type.

It is another object of the invention to provide a converter which is arranged to be mounted between a camera body and a lens barrel; and to be provided with a driving mechanism for causing a focusing action and an aperture stopping action within the lens barrel to be performed and also with a communication means for communication between the camera body and the lens barrel, so that any of the lens barrels of different types can be used in combination with the camera body.

These and other objects and features of the invention will become apparent from the following detailed description of embodiments thereof taken in connection with the accompanying drawings.

DETAILED DESCRIPTION OF THE PREFERRED EMBODIMENTS

Figure 1:
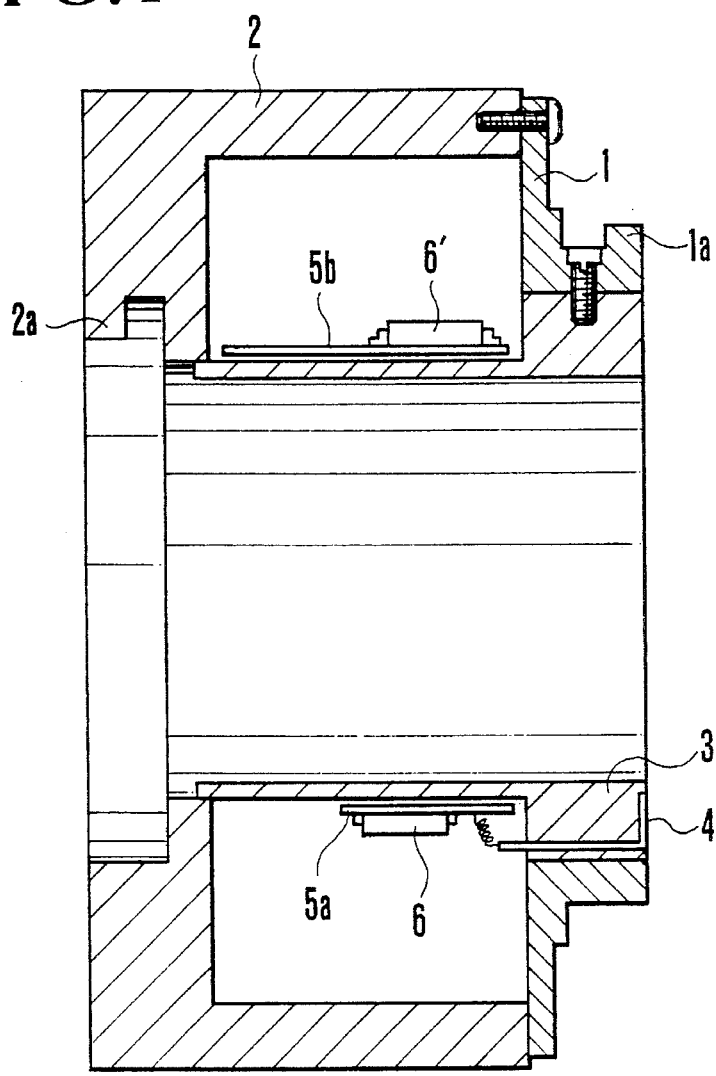
FIG. 1 is a sectional view showing a converter which is arranged as a first embodiment of this invention.
Figure 2:
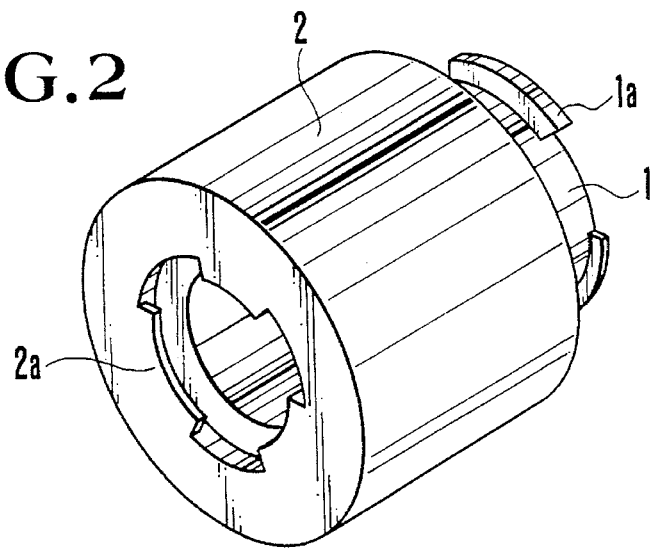
FIG. 2 is an oblique view of the converter of FIG. 1.
Figure 3:
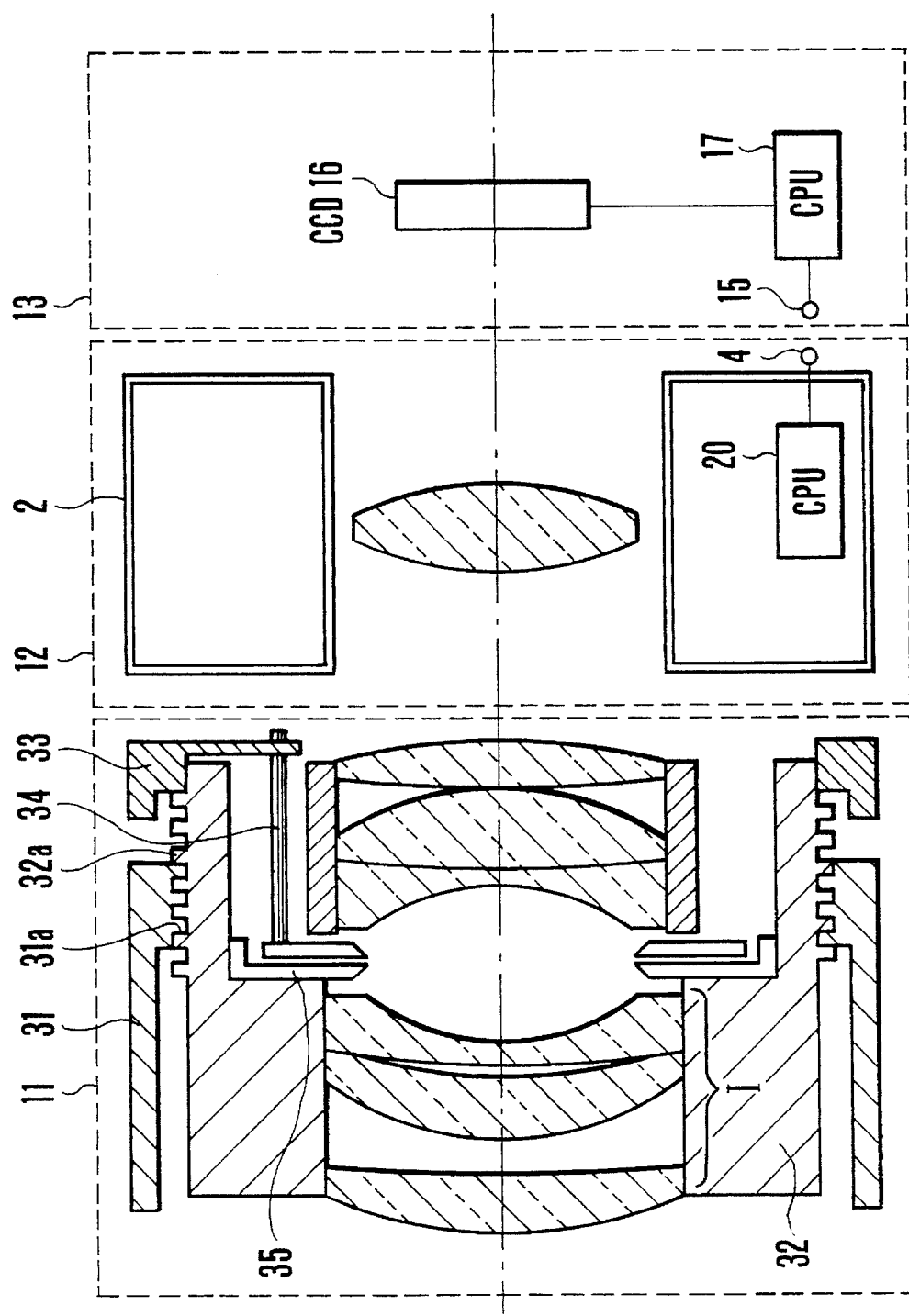
FIG. 3 shows the arrangement of a camera system using the converter of FIG. 1.
Figure 4:
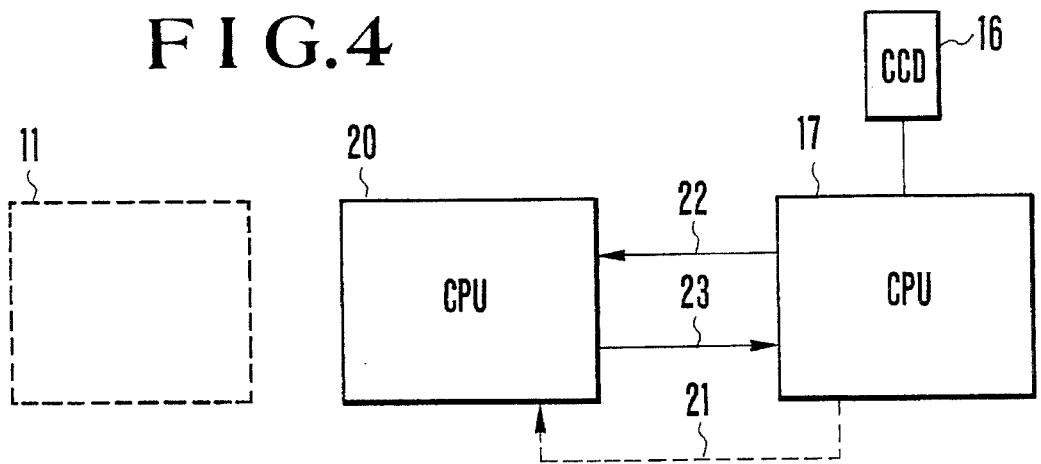
FIG. 4 shows the signal flow of the first embodiment.

FIG. 1 is a sectional view of a converter which is arranged as a first embodiment this invention. FIG. 2 is an oblique view of the same converter. FIG. 3 shows the arrangement of a camera system in a state of having the converter of FIG. 1 attached to the camera system. FIG. 4 shows a signal flow.

A first bayonet mount 1 has a claw part 1a which is attachable to the mount of a video camera 13. A converter body 2 has a second bayonet mount part 2a which is attachable to a lens barrel 11. An internal fixed part 3 has a plurality of contacts 4 insert-molded therein. The converter includes circuit boards 5a and 5b and circuit elements 6 and 6' including a CPU 20. The CPU 20 is provided with memory means which stores therein information indicative of a manual type lens barrel.

FIG. 3 shows the converter 12 in a state of being mounted between the video camera 13 and the lens barrel 11. In the case of FIG. 3, the lens barrel 11 is of a manual type which allows focus and aperture control actions to be performed only by manual operations. The illustration includes a focusing operation ring 31. A holding tube part 32 which holds a focusing lens I has a gear 32a. The gear 32a is arranged to engage a gear 31a which is provided on the focusing operation ring 31. The focusing action can be accomplished with the focusing lens I, with the holding tube part 32 moved by gear connection in the direction of an optical axis when the focusing operation ring 31 is manually rotated. A reference numeral 33 denotes a diaphragm operation ring 33. A transmission member 34 is arranged to transmit the rotation of the diaphragm operation ring 33. A numeral 35 denotes a diaphragm device. When diaphragm operation ring 33 is manually rotated, the transmission member 34 moves in association with the rotation of the ring 33 to drive the diaphragm device 35 to vary its aperture.

In the video camera 13, contacts 15 are arranged to come into contact with the contacts 4 of the converter 12. When any lens barrel (not shown) that is compatible with the video camera 13 is directly mounted, the contacts 15 come into contact directly with the contacts of the lens barrel. A CCD 16 is arranged to form a video signal by receiving the light of an object to be shot and also serves to detect a focusing state and to measure light. A CPU 17 is arranged within the camera to perform arithmetic operations upon receipt of the outputs (related to focusing and light measurement) and to output aperture control information and focus control information through the contacts 15. Further, the CPU 17 is arranged to output through the contacts 15 a signal 22 for confirmation of the type of the lens barrel mounted when a power supply is turned on, as will be described further later herein; and to determine and identify the type of the lens barrel according to a signal which is supplied through the contacts 15 to the CPU 17 in response to the signal 22 from the CPU 17.

FIG. 4 shows communication between the CPU 20 and the CPU 17. When the signal 22 for confirmation of the type of the lens barrel is supplied from the CPU 17, the CPU 20 supplies to the CPU 17 a signal 23 indicating that the lens barrel is of the manual type. With the signal 23 supplied, the video camera 13 performs an operation to be performed with a manual type lens barrel mounted on the camera. In a case where no signal comes in response to the supply of the signal 22 from the CPU 17, the operation of the video camera 13 comes to a stop by assuming either that no lens barrel is mounted on the video camera or that a lens barrel mounted on the camera is not of a right kind.

In the case of the first embodiment described above, the lens barrel 11 is not of the right kind. In this case, however, the use of the converter 12 enables the lens barrel 11 to be determined and identified similarly to a manual type lens barrel of the right kind. Therefore, a shooting operation can be carried out by the video camera 13 with the lens barrel 11 mounted.

Figure 5:
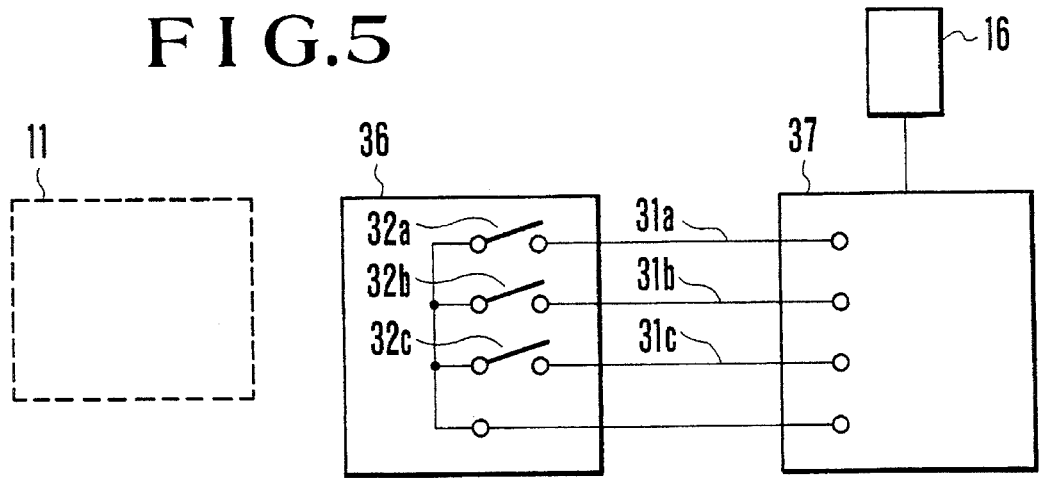
FIG. 5 shows a second embodiment of this invention.

FIG. 5 shows a second embodiment of the invention. In the second embodiment, the video camera is arranged to identify the type of lens barrel by means of logic circuits instead of by the communication between two CPUs. In this case, the converter 12 is provided with a signal generating circuit 36. The video camera 13 is provided with a signal receiving circuit 37. The signal generating circuit 36 is arranged to form binary signals 31a to 31c either by means of an electrical encoder (such as a brush) or by turning on and off electrical contacts 32a, 32b and 32c. The video camera 13 is caused to operate with a preset signal formed by sending the binary signals 31a to 31c to the signal receiving circuit 37.

Figure 6:
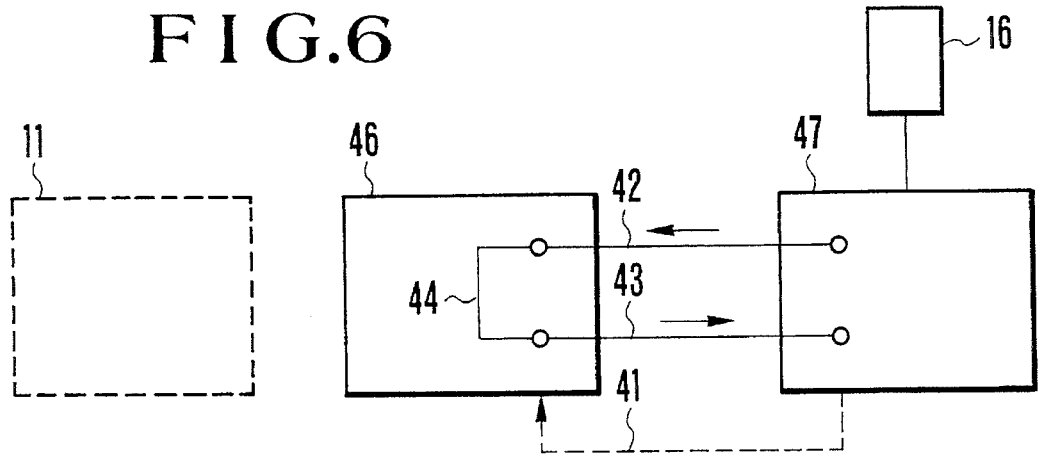
FIG. 6 shows a third embodiment of the invention.

FIG. 6 shows a third embodiment of this invention. The third embodiment is arranged as follows: A signal 42 is sent from a circuit 47 which is disposed within the video camera 13 to a circuit 46 disposed within the converter 12 in synchronism with a clock signal 41. The signal 42 is then sent back to the circuit 47 via a short-circuiting circuit 44 as a signal 43. In this case, the same advantageous effect as that of the first embodiment is attained by allowing the circuit 47 to store data indicating that the lens barrel 11 is of the manual type usable by the embodiment if the signal 42 and the signal 43 are equal to each other.

While each of the embodiments is arranged to electrically perform the signal transmission, it is apparent to those skilled in the art that an optical communication signal or an amount of mechanical movement may be easily converted into an electrical signal.

The camera body is assumed by way of example to be that of a video camera in each of the embodiments described. However, this invention is of course likewise applicable to a still video camera or a silver-salt type still camera.

The converter of each of the first, second and third embodiments is arranged to let the camera body know that a lens barrel of a specific type is mounted on the camera body. The converter thus enables the camera system to perform a shooting operation with such a different type lens barrel that is essentially unusable.

Figure 7:
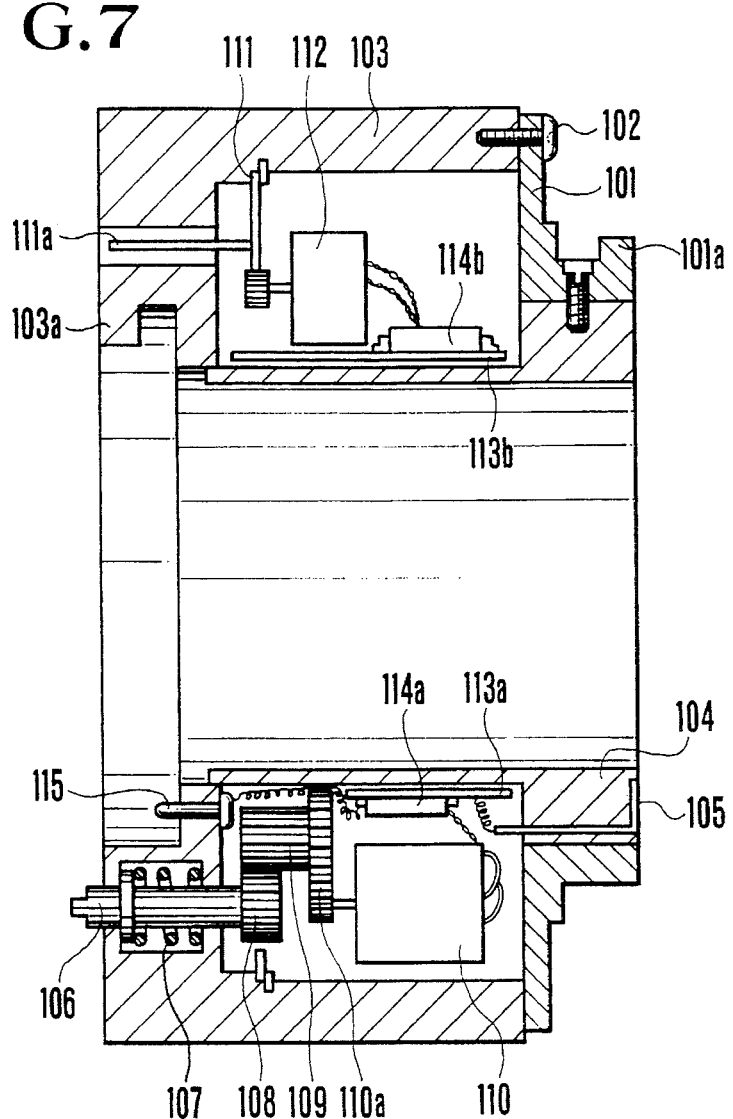
FIG. 7 is a sectional view of a converter which is arranged as a fourth embodiment of the invention.
Figure 8:
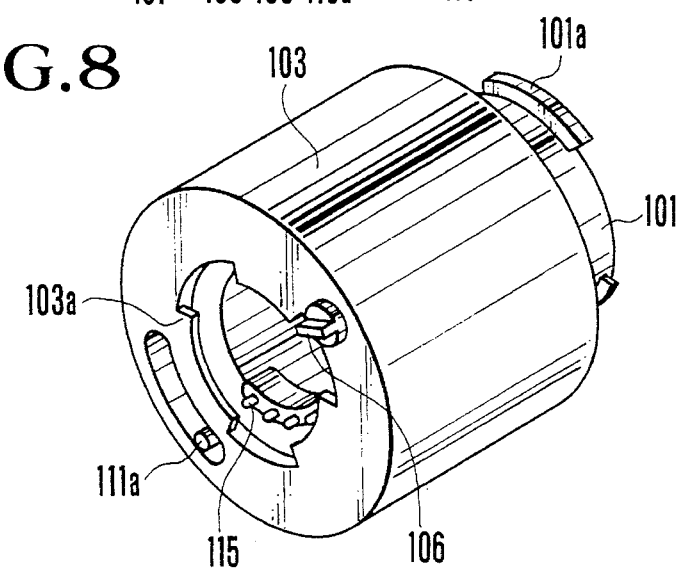
FIG. 8 is an oblique view of the converter of FIG. 7.
Figure 9:
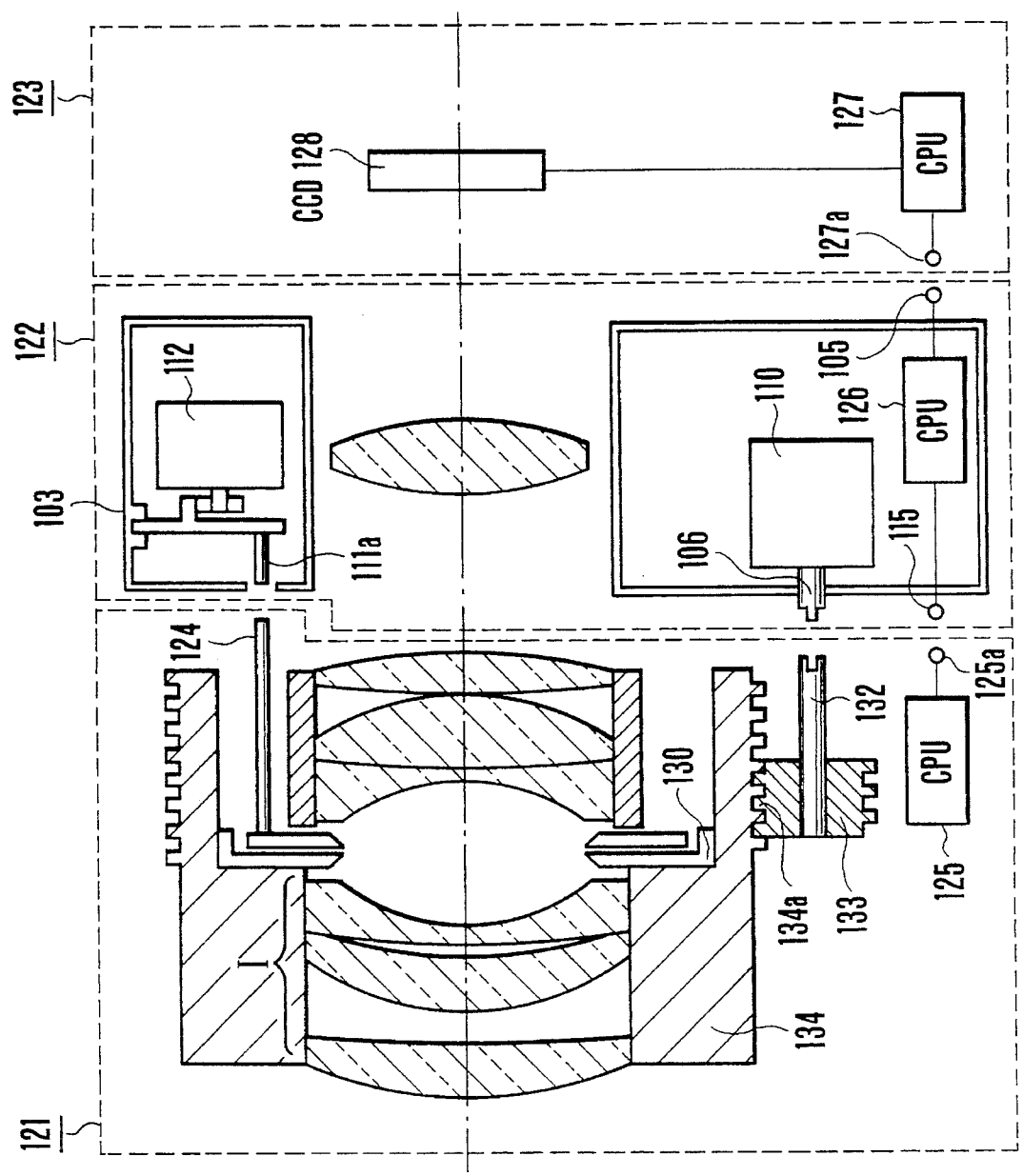
FIG. 9 shows the arrangement of a camera system using the converter of FIG. 7.

FIG. 7 shows in a sectional view a converter which is arranged as a fourth embodiment of the invention. FIG. 8 is an oblique view of the same converter. FIG. 9 shows the arrangement of a camera system in a state of having the same converter attached to the camera system.

Referring to these figures, a first bayonet mount 101 has a claw part 101a which is attachable to the mount of a video camera 123 and is secured to the body 103 of the converter by means of screws 102. A second bayonet mount part 103a is attachable to the mount of a lens barrel 121. An internal fixed part 104 has a plurality of contacts 105 insert-molded therein. The contacts 105 are arranged to come into contact with contacts 127a which are disposed on the side of the video camera 123 when the converter is attached to the body of the video camera 123. An interlocking shaft 106 is provided for driving a focusing lens I which is disposed within the lens barrel 121. The interlocking shaft 106 is retractably movable in the direction of an optical axis. A spring 107 is arranged to urge the interlocking shaft 106 to move in the direction of protruding to the outside. An automatic focusing (AF) motor 110 is provided with an output gear 110a. The rotation of the output gear 110a is arranged to be transmitted via transmission gears 108 and 109 to the interlocking shaft 106. A member 111 is interlocked with a diaphragm driving motor 112. A transmission member 111a enables the member 111 to be connected to a diaphragm interlocking member 124 which is disposed within the lens barrel 121. Reference numerals 113a and 113b denote circuit boards. Numerals 114a and 114b denote groups of circuit chips including a CPU 126. The CPU 126 is arranged to control the motors 110 and 112 and to cause information on the intrinsic matters of lens written in a CPU 125 within the lens barrel 121 to be converted into a shape communicable with the video camera 123. A plurality of contacts 115 are arranged to come into contact with contacts 125a disposed on the side of the lens barrel 121.

Referring to FIG. 9, the lens barrel 121 is used as an interchangeable lens. As apparent from FIG. 9, a diaphragm device 130 is arranged to be driven to open or close by the mechanical motion of a diaphragm interlocking member 124 around the optical axis which results from the movement of the transmission member 111a within the converter 122. A connection shaft 132 is arranged to be connected to the interlocking shaft 106 disposed within the converter 122. A gear 133 is arranged to be rotated by the rotation of the connection shaft 132. The gear 133 engages the gear part 134a of a focusing-lens holding tube part 134. The CPU 125 is arranged within the lens barrel 121 to store intrinsic lens information (such as a focal length, an aperture control range, etc.) and also to communicate with the video camera 123. The CPU 125 is provided with contacts 125a which are arranged to come into contact either with the contacts 127a of the video camera 123 or with the contacts 115 of the converter 122 for communication between CPUs.

A reference numeral 123 denotes the video camera. The video camera 123 has a CCD 128. The CCD 128 forms a video signal by receiving the light of an object to be shot and is arranged also to detect the state of focus and to measure light. A CPU 127 is arranged within the video camera 123 to receive the outputs (results of focus detection and light measurement) of the CCD 128, to perform arithmetic operations and to output aperture control information and focus control information via the contacts 127a. Normally, a motor for driving a diaphragm and a motor for moving a focusing lens are disposed within the interchangeable lens to be mounted on the video camera 123. Generally, therefore, the aperture control and the focus control can be accomplished by controlling the two motors with the CPU which is disposed within the lens barrel on the basis of the above-stated control information.

In the case of the fourth embodiment, however, the diaphragm driving motor and the focusing-lens moving motor are not included in the lens barrel 121. The lens barrel 121 is arranged to receive mechanical driving forces from the camera body for controlling the aperture and for moving the focusing lens. The fourth embodiment is characterized in that the use of the converter 122 enables the operator to take shots even in cases where an interchangeable lens of such a different type as the lens barrel 121 is mounted on the video camera 123 in place of an interchangeable lens of the normal type.

The converter 122 of the fourth embodiment is mounted between the video camera 123 and the lens barrel 121. The bayonet mounts 101 and 103a are used for mounting the converter 122. With the converter 122 mounted, the contacts 105 come into contact with the contacts 127a and the contacts 115 with the contacts 125a to permit communication. Under this condition, the CPU 127 which is disposed on the side of the video camera 123 receives the intrinsic lens information from the CPU 125 of the lens barrel 121 via the CPU 126 of the converter 122. Then, the CPU 127 forms and outputs via the contacts 127a the aperture control information and the focus control information on the basis of information obtained from the CCD 128. Further, the CPU 126 which receives the intrinsic lens information from the CPU 125 is arranged to correct any changes brought about in the intrinsic lens information by the intermediary presence of the converter 122 and to convert the information into a state suited to the video camera 123. The CPU 126 of the converter 122 receives the above-stated control information via the contacts 105. The CPU 126 then causes each of the motors 110 and 112 to rotate and controls their rotation according to the control information. The rotation of the motors 110 and 112 causes the interlocking shaft 106 and the transmission member 111a to rotate. The above-stated focusing-lens holding tube part 134 is moved in the direction of the optical axis by the rotation of the gear 133 to move the focusing lens I to an in-focus position. Further, the aperture of the diaphragm device 130 is stopped down to an apposite exposure position by the movement of the diaphragm interlocking member 124. A shooting operation thus can be carried out by performing automatic focusing and automatic exposure control, despite of the use of the lens barrel 121 which is of the type arranged to receive from the camera body the force required for control over the focusing action and control over the diaphragm aperture for the video camera 123 which is designed for use of a lens barrel of the type having motors arranged within the lens barrel. Further, the use of the converter permits mounting of such a lens barrel that cannot be mounted directly on the camera body because of a difference in type between their mounts.

In the case of the fourth embodiment, the camera body is assumed, for example, to be the body of a video camera. However, the invented arrangement is of course likewise applicable also to a still video camera or a silver-salt type still camera.

The converter of the fourth embodiment is arranged, as described above, to receive the intrinsic lens information from memory means disposed within the lens barrel; to supply the information to the camera body after correcting any change that results from the intermediary use of the converter; and to drive the focusing and aperture controlling motors in accordance with control information received from the camera body, in such a way as to actuate the focusing-lens moving mechanism and the diaphragm device disposed within the lens barrel which has no drive source disposed therein. Therefore, a shooting operation can be accomplished by performing the automatic control over the focusing lens and the diaphragm device even in a case where the camera body and the lens barrel are of different types.

Further, even if a lens barrel cannot be mounted on a camera body for shooting because of a difference in type of their mounts, the converter makes the lens barrel mountable on the camera body.

What is claimed is:

1. A converter mountable between a camera body and a lens barrel, comprising:

a) a first driving mechanism for driving a focusing-lens moving mechanism disposed within said lens barrel;

b) a first motor as a drive source of said first driving mechanism;

c) a second driving mechanism for driving a diaphragm device disposed within said lens barrel;

d) a second motor as a driving source of said second driving mechanism; and e) control means for communication with said camera body and said lens barrel, said control means including a converter circuit disposed within said converter which communicates with a camera circuit disposed within said camera body and with a lens circuit disposed within said lens barrel and to control said first and second motors by receiving focus control information and aperture control information from said camera circuit.

2. A converter according to claim 1, wherein said converter circuit is arranged to supply lens information stored by said lens circuit to said camera circuit.

3. A converter according to claim 1, wherein said converter circuit corrects and supplies said lens information to said camera circuit.

4. A converter according to claim 1 further comprising a first mount for connection with said camera body and a second mount for connection with said lens barrel, wherein said first mount and said second mount have a different mount type.

5. A camera system comprising a camera body, a lens barrel and converter which is mounted between said camera body and said lens barrel, a) said camera body including:

a communication contact for communication with said converter; and a camera circuit arranged to output focus control information and aperture control information through said communication contact;

b) said lens barrel including:

a communication contact for communication with said converter;

a focusing-lens moving mechanism arranged to move a focusing lens in the direction of an optical axis; and a diaphragm device arranged to vary the amount of aperture of a diaphragm; and a lens circuit arranged to output lens information through said communication contact;

c) said converter including:

communication contacts arranged to come into contact with said contact of said camera body and said lens barrel;

a first driving mechanism for driving said focusing-lens moving mechanism within said lens barrel;

a first motor as a drive source of said first driving mechanism;

a second driving mechanism for driving said diaphragm device within said lens barrel;

a second motor as a driving source of said second driving mechanism; and a converter circuit in communication with said camera circuit and said lens circuit, said converter circuit being arranged to supply lens information of said lens circuit to said camera circuit and to control said first and second motors on the basis of the focus control information and the aperture control information supplied from said camera circuit.

6. A camera system according to claim 5, wherein said converter circuit corrects and supplies said lens information to said camera circuit.

* * * * *